United States Patent
Belakshe et al.

(10) Patent No.: US 12,319,870 B1
(45) Date of Patent: Jun. 3, 2025

(54) ACTIVATOR FOR PLAIN AND FOAMED EXOTHERMIC REACTION IN A WELLBORE

(71) Applicant: Halliburton Energy Services, Inc., Houston, TX (US)

(72) Inventors: Ravikant S. Belakshe, Pune (IN); Sumit Ramesh Songire, Pune (IN); Pratiksha Sharma, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 8 days.

(21) Appl. No.: 18/516,852

(22) Filed: Nov. 21, 2023

(51) Int. Cl.
  *C09K 8/524* (2006.01)
  *E21B 37/06* (2006.01)
  *E21B 47/00* (2012.01)

(52) U.S. Cl.
  CPC .............. *C09K 8/524* (2013.01); *E21B 37/06* (2013.01); *E21B 47/006* (2020.05)

(58) Field of Classification Search
  CPC ........ C09K 8/524; C09K 8/592; C09K 8/536; C09K 8/72; C09K 8/52; C09K 2208/32; C09K 8/528; C09K 8/92; C09K 8/845; C09K 8/74; E21B 36/008; E21B 43/24; E21B 37/06; E21B 37/00
  See application file for complete search history.

(56) References Cited

U.S. PATENT DOCUMENTS

| | | |
|---|---|---|
| 4,178,993 A | 12/1979 | Richardson et al. |
| 2015/0361328 A1 | 12/2015 | Almutairi |
| 2018/0274348 A1* | 9/2018 | Karale ................ E21B 43/2405 |
| 2021/0095189 A1 | 4/2021 | May et al. |
| 2022/0235259 A1 | 7/2022 | May et al. |
| 2023/0272694 A1* | 8/2023 | Braganza ................ E21B 37/06 166/300 |

OTHER PUBLICATIONS

International PCT Application No. PCT/US2024/043408, International Search Report and Written Opinion mailed Dec. 4, 2024, 11 pages.
Wei et al., "Application of in-situ Heat Generation Plugging Removal Agents in Removing Gas Hydrate: a Numerical Study", Fuel, vol. 323, Sep. 2022, pp. 1-15.
Halliburton Energy Services, Inc., "ExoKleen® Thermal Cleaning Service", Product Sheet, Jun. 2022, 1 page.
Halliburton Energy Services, Inc., "Sure Therm™ Targeted Heat Placement to Remove Pipeline Deposits", Product Sheet, Oct. 2022, 1 page.

* cited by examiner

*Primary Examiner* — Zakiya W Bates (74) *Attorney, Agent, or Firm* — Kilpatrick Townsend & Stockton LLP (57) ABSTRACT

A catalyst and method of use can involve causing a clean exothermic reaction in a flowline environment. The mixture can include sodium nitrite, an ammonium-based compound, and an activator that can be injected into a fluid flow path. The activator can include an acid that can be generated from a lactone. The fluid flow path can be a pipeline, a flowline, a wellbore, or a subterranean formation. The mixture can cause an exothermic reaction in the fluid flow path and remove, using the exothermic reaction, a damaging material from the fluid flow path.

17 Claims, 7 Drawing Sheets

ACTIVATOR FOR PLAIN AND FOAMED EXOTHERMIC REACTION IN A WELLBORE

TECHNICAL FIELD

The present disclosure relates generally to wellbore operations and, more particularly (although not necessarily exclusively), to a low temperature catalyst or activator for an exothermic reaction in a subterranean formation, a wellbore, or a flowline.

BACKGROUND

Flowline and wellbore operations may include various equipment, components, methods, or techniques to displace and release hydrocarbon fluids for recovery from a subterranean or sub-oceanic formation and hydrocarbon flowlines including surface and subsea pipelines. A pipeline along the ocean floor may be used to transport hydrocarbon fluids from the field or gathering systems to refineries. Hydrocarbons can flow from the formation into the tubulars of the wellbore where temperatures can fluctuate from high temperatures to low temperatures. The temperature gradient within the flowlines, the wellbore or the subterranean formation can create an environment in which damaging material such as paraffin accumulates, and the damaging material can cause issues with the flow of hydrocarbons through the wellbore or pipeline that can impact various operations.

DETAILED DESCRIPTION

Certain aspects and examples of the present disclosure relate to an activator for initiating an exothermic reaction in target zones for removing damaging material from fluid flowlines. An activator can be used in a reaction mixture to accelerate the rate at which a reaction takes place. An exothermic reaction can produce or otherwise release energy upon reacting, and the energy can be released as heat to an area surrounding the exothermic reaction. Production operations can include entering subterranean formations deep below the surface, or the pumping of liquid in fluid flowlines deep underground or subsea. The deep operations may include areas within the flowlines or subterranean formations where the temperature varies from areas of high temperature to areas of low temperature intermittently along segments of the fluid flowline. The low temperature zones may cause hydrocarbon fluids to form damaging material. The damaging material can include waxes, paraffin deposits, scales, and the like that can restrict the flow of the hydrocarbon fluid with respect to the flowline. For example, the low temperature zones may accumulate paraffin deposits along the inner walls of the wellbore, and over time, the paraffins gradually decrease the inner diameter of the wellbore until no fluid can pass through the wellbore. The increased temperature can also help remove emulsions which have formed downhole.

Other techniques used during a wellbore operation for removing damaging material may include acid stimulation treatments for acid soluble materials. Acid soluble materials can include scale material and acid soluble plugging material such as calcium carbonate, salts, and clays (soluble in hydrofluoric acid). Removing damaging material may also include the use of solvents such as xylene for removal of organic material such as paraffins or asphaltenes. Additional techniques used during a production operation for removing damaging material may include methods such as the use of pumping hot oil downhole to thin down paraffins or the use of scrapers to remove material from the inner diameter of the tubulars. Devices such as pigs can be pumped through pipelines to try and remove excess material from the pipeline. The other techniques may suffer from increasing operation time, requiring additional workover, and may negatively impact the reservoir structure. Alternatively, other techniques used for removing damaging materials may produce or otherwise result in undesirable byproducts that may be harmful to the environment surrounding the wellbore or to the operators performing the operations.

To remove damaging material without impacting the production operation, an exothermic reaction mixture can be used with an activator. The exothermic reaction and the activator can generate energy release in the form of an exotherm and the generation of clean nitrogen gas. Clean Hydrogen gas may refer to the production of pure nitrogen gas and may be referred to herein as diatomic nitrogen or $N_2$ gas. For example, during production operations, incorporating the exothermic reaction mixture and activator into the target zone can increase the temperature within the target zone of the flowline while other operations are being performed. The other operations may include, for example, a wellbore operation, a drilling operation, a completion operation, a stimulation treatment, or any other suitable operation within the wellbore. The reaction mixture can include an ammonium-based compound, sodium nitrite, and an activator, and the reaction mixture can be injected into the wellbore at one or more target locations for raising the temperature of the surrounding environment to remove damaging material from the wellbore. In some embodiments, the reaction mixture may further include a foaming agent. The foaming agent may be used to generate a foam comprising the exothermic reaction. In some embodiments, the foaming agent may include a surfactant including approximately 10-30% of inner salt of alkyl amines or from approximately 30-60% of ethoxylated alcohols. For example, the surfactant may be selected from the group including HC-2™ or PEN- 5M™ foaming agent. The foam generated may have a lower density than the fluids and may increase the efficiency of removal of the damaging material from the flowline.

In examples in which an exothermic reaction can be provided by a mixture of ammonium chloride ($NH_4Cl$) and sodium nitrite, the reaction can be activated by including an acid, that may be generated from a lactone, for controlling the initiation of the exothermic reaction. The activator can be an acid generated from a lactone wherein the lactone may be gluconolactone, glucuronolactone, α-acetolactone, β-propiolactone, γ-butyrolactone, δ-valerolactone, ε-caprolactone, γ-decalactone, δ-decalactone, γ-dodecalactone, γ-octalactone, γ-nonalactone, γ-undecalactone, ellagic acid (hexahydroxydiphenic acid dialactone), flavogallonic acid dilactone, tergallic acid dilactone, valoneic acid dilactone, ethylene brassylate, or any suitable combination thereof. As used herein, an "acid" may refer to a composition that does not completely dissociate in solution. For example, an acid that may not completely dissociate may refer to an acid that has a dissociation constant, or Ka, of from $10^{-2}$ to $10^{-14}$. Additionally, an acid as referred to herein may be generated from a lactone. For example, an acid generated from a lactone can include gluconic acid, glucuronolactone acid, gamma hydroxybutyric acid, gamma hydroxyvaleric acid, polyhydroxy acids, or any derivates thereof.

In some examples, raising the temperature of the flowline at a target location may cause the damaging material to be removed from the target location. For example, the exothermic reaction can be initiated in the target location, and the heat from the exothermic reaction may remove the damaging material from the target location. The reaction mixture can be controlled via the addition of the activator for accelerating or delaying the release of energy allowing for targeted energy release as an initiation mechanism. In some embodiments, the reaction mixture of sodium nitrite, the ammonium-based compound, and the activator may include the addition of solvents or surfactants for aiding in removal of the damaging material.

During a production operation, the tubulars of the flowline may include areas of high temperatures and areas of low temperatures intermittently along the flowline or subterranean formation. When an area of low temperature within the tubular or flowline comes in contact with the hydrocarbon fluids during the operations, damaging material can build up along the inner side of the tubular or flowline and restrict the flow of hydrocarbon fluid from the wellbore. Damaging material can include organic material and inorganic material that can adhere or otherwise stick to the inner part of the flowline or pipeline, negatively impacting wellbore operations. As the material accumulates, the organic and inorganic material can continue to build up until the flow of fluids through the pipeline becomes restricted causing a decrease in flow through the pipeline. When the flow becomes restricted, the organic matter and inorganic matter can cause damage to occur to the lowline or pipeline. For example, the damaging material can build within the flowline or pipeline causing the pipe to burst or break thus causing fluid in the flowline to flow into surrounding areas. In some embodiments, damaging material can include scales, waxes, paraffin deposits, emulsions, and the like. For example, in areas of low temperatures in a flowline, waxes may continually build up in the low temperature areas and begin to slowly restrict fluid flow through the flowline. The elements added to the exothermic reaction and activator can control the energy release from the reaction to the surrounding environment. In some flowlines, the reaction mixture and the activator can include a buffer, a surfactant, a solvent, or a suitable combination thereof, to affect such as, increase or decrease the rate of reaction. The addition of the activator and other components can be deployed in the wellbore to targeted depths.

As used herein, the terms "pipeline", "flowline", "tubular", or "wellbore" may refer to a flow path in which material can build up. The flow path for example can be from within a sub-oceanic formation or subterranean formation through which a pipeline, flowline, tubular, or wellbore can be positioned. The exothermic reaction can be used in any or all combinations of the above for increasing the reaction temperature to aid in or remove damaging material from the fluid flow path.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
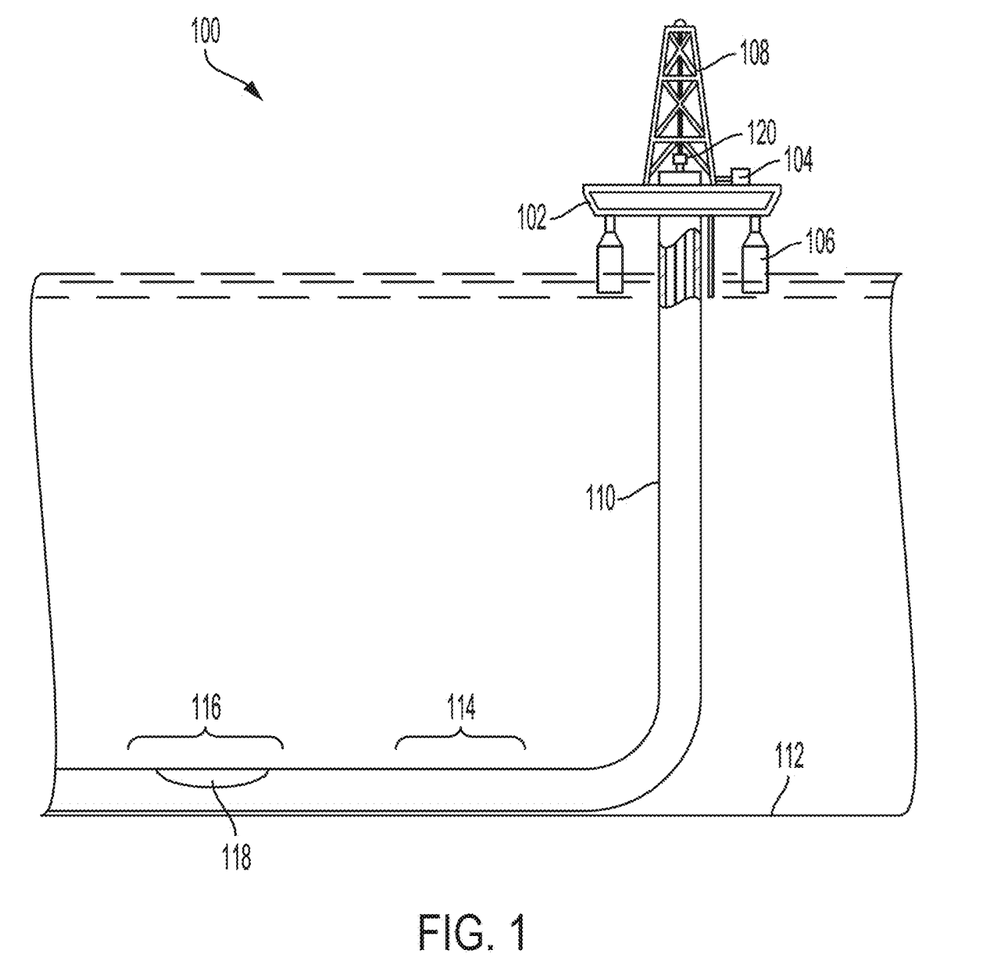
FIG. 1 is a schematic of an example of an offshore environment with a flowline for carrying fluids that can include damaging material in lower temperature segments according to one example of the present disclosure.

FIG. 1 is a schematic of an example of an offshore environment with a flowline 110 for carrying fluids according to one example of the present disclosure. The offshore environment 100 can include a floating workstation 106 that can be positioned over a submerged oil or gas flowline located along a sea floor 112. The floating workstation can include a derrick 108 and a hoisting apparatus 120 for raising and lowering tools to test the flowline 110. A pump 104 located on the deck 102 can inject fluid into the flowline 110 for removing damaging material 118 that can build up in the flowline 110. The floating workstation 106 can be an oil platform as depicted in FIG. 1 or an aquatic vessel capable of performing the same or similar wellbore operations. In some examples, the techniques described herein can also be applied to land-based context for flowline and wellbore management. The flowline 110 can range in lengths from a few hundred meters to several kilometers and can be varied depending on the operation in which the flowline 110 is being employed.

The flowline 110 can include a high temperature segment 114 and a low temperature segment 116. The low temperature segment 116 can cause the build-up of damaging material 118, such as scales, waxes, paraffins, etc., that can reduce the efficiency or output of the flowline 110. The low temperature segment 116 and high temperature segment 114 can be intermittently dispersed thought the flowline 110. The flowline 110 that is located along the sea floor 112 may have one or more low temperature segments 116 that may include the damaging material 118 adhered to the inner wall of the flowline 110. The one or more low temperature segments 116 can cause multiple segments within the flowline 110 to experience reduced hydrocarbon flow. Accordingly, an exothermic reaction solution can be provided, for example in the low temperature segment 116, for removing the damaging material 118.

Figure 2:
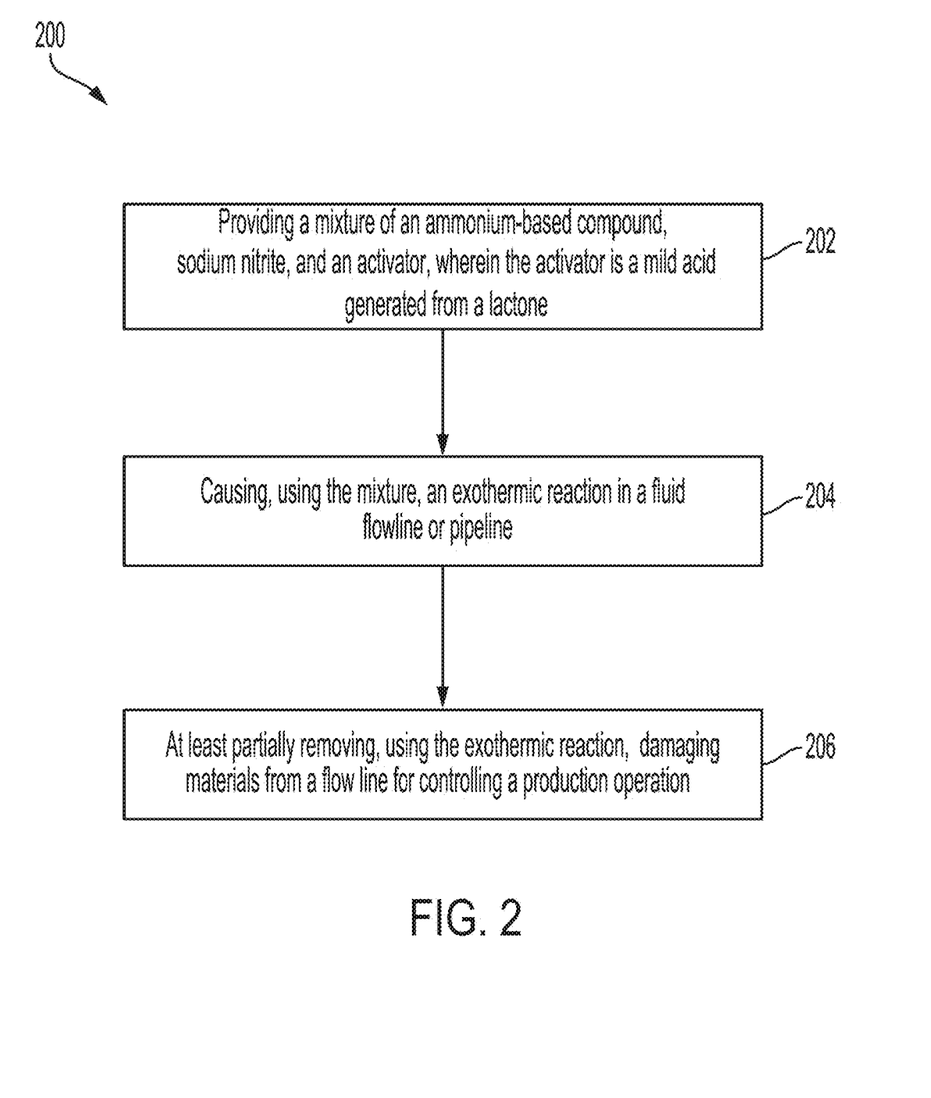
FIG. 2 is a flowchart of a process for removing damaging material from a subterranean formation, a wellbore, or a pipeline using an activator for an exothermic reaction according to one example of the present disclosure.

FIG. 2 is a flow chart of a process 200 for removing the damaging material 118 from the flowline 110 according to one example of the present disclosure. At block 202 a mixture is provided in the flowline 110. The mixture can include an exothermic reaction mixture that can include sodium nitrite, an ammonium-based compound, and an activator. For example, the reaction mixture may include sodium nitrite, ammonium chloride, and any one of gluconolactone, glucuronolactone, α-acetolactone, β-propiolactone, γ-butyrolactone, δ-valerolactone, ε-caprolactone, γ-decalactone, δ-decalactone, γ-dodecalactone, γ-octalactone, γ-nonalactone, γ-undecalactone, ellagic acid (hexahydroxydiphenic acid dialactone), flavogallonic acid dilactone, tergallic acid dilactone, valoneic acid dilactone, ethylene brassylate, or any combination thereof. An operator of the flowline 110 may deploy or otherwise position a tubing into the flowline 110 at a desired depth. The operator can inject the reaction mixture into the flowline 110. In some examples, a computing device or other automatic control device can deploy the tubing in the flowline 110 and inject (or provide) the reaction mixture into the flowline 110. In some embodiments, the location of the damaging material within the flowline may be known by the operator or the computing device and the activator added to the reaction mixture may be adjusted to cause the reaction mixture to initiate once the reaction mixture reaches the target location. For example, the activator can be added to the reaction mixture in an amount of from about 0.25 wt. % to about 10 wt. % by weight to volume of the reaction mixture. By increasing the amount of the activator added to the reaction mixture, one skilled in the art would understand that the reaction would initiate faster than if less amounts of the activator is added. For example, adding 2 times more of the activator, the time for the exothermic reaction mixture to reach the peak temperature release my be cut in half.

Additionally or alternatively, the reaction mixture may optionally include a foaming agent. For example, a foaming agent may be selected from blend compositions of ethoxylated alcohols and isopropanol. In some embodiments, the foaming agent may be a surfactant. In some embodiments, the foaming agent may include a surfactant including approximately 10-30% of inner salt of alkyl amines or from approximately 30-60% of ethoxylated alcohols. For example, the foaming agent may selected from the group including HC-2™ or PEN-5M™ foaming agent. In some embodiments, the foaming agent may include alkyl amines, alkylamine salts, alkylamidobetaines such as cocoamidopropyl betaine, tirmethylallowammonium chloride, trimethylcocoammonium chloride, cocoamidopropyl betaine, amide quarternary ammonium surfactants with a chemical formula $C_n$—$H_{2n+1}$ CONH(CH$_2$)$_2$N$^+$(CH$_3$)3·CH3CO3- (n=9, 11, 13, 15), 2-(2-butoxyethoxy)ethanol, 2-(2-ethoxyethoxy)ethanol, 2-(2-methoxyethoxy)ethanol, 2-butoxyethanol, 2-ethoxyethanol, 2-ethoxyethyl acetate, bis(2-methoxyethyl)ether, alkoxylated nonylphenols, alkyloxylated lineral alcohols, alkyloxylated branched chain alcohols, propylene oxide condensate block copolymers, salts of aliphatic sulfonic acids, alpha-olefin sulfonate, C8 to C22 alkylethoxylate sulfate, or any combination thereof. In some embodiments, the exothermic reaction including the activator and the foaming agent may be used in a flowline, pipe line, or subterranean formation where the temperature range is from about 39° F. (4° C.) to about 122° F. (50° C.).

At block 204 an exothermic reaction is caused in the flowline or pipeline 110. When the reaction mixture reaches a point of initiation, the ammonium-based compound and sodium nitrite may react, which may cause the release of energy. The point of initiation may include the instance in which the activation energy of the reaction mixture is achieved for the transition state to occur. The activation energy of a reaction may be a property of the reactants in a reaction. The activation energy used to reach the point of initiation can include a temperature change, a pH shift, the addition of an activator, and the like. For example, the reaction mixture of sodium nitrite and ammonium chloride may reach the point of initiation at a temperature of 77° F. (25° C.). The energy of the reaction mixture may release in the form of heat to the surrounding fluids to increase the temperature of the flowline or pipeline 110 in a select region. The ammonium-based compound can comprise an ammonium-based salt such as ammonium chloride, ammonium carbonate, ammonium acetate, ammonium phosphate, ammonium nitrate, other suitable salts, or any combination thereof. The ammonium-based compound can comprise a compound derived from ammonia, such as urea. In some embodiments, urea can react with sodium nitrite and can generate energy, released as heat, to the surrounding environment. For example, the reaction of ammonium chloride and sodium nitrite can generate nitrogen gas to increase pressure within the flowline or pipeline 110. Additionally or alternatively, the reaction can generate energy, released as heat, to the surrounding environment. In the low temperature segment 116 of the flowline or pipeline 110, the reaction may not initiate without the addition of the activator.

To initiate the reaction in a low temperature segment, an activator can be added to the reaction mixture. The activator can be an acid generated from a lactone wherein the lactone may be gluconolactone, glucuronolactone, α-acetolactone, β-propiolactone, γ-butyrolactone, δ-valerolactone, ε-caprolactone, γ-decalactone, δ-decalactone, γ-dodecalactone, γ-octalactone, γ-nonalactone, γ-undecalactone, ellagic acid (hexahydroxydiphenic acid dialactone), flavogallonic acid dilactone, tergallic acid dilactone, valoneic acid dilactone, ethylene brassylate, or any combination thereof. For example, gluconolactone in water can hydrolyze to produce gluconic acid that can further dissociate to produce hydrogen ions. As the gluconolactone hydrolyzes, the gluconic acid can generate the hydrogen ions, thereby decreasing the pH of the solution. Additionally or alternatively, hydrogen ions can reduce the pH to between 3 and 6 thereby initiating the reaction of the ammonium-based compound and the sodium chloride. The hydrogen ions can be used to catalyze the reaction of ammonium chloride and sodium nitrite. In some examples, to delay the hydrolysis of gluconolactone in the water to generate the hydrogen ions, the activator may be added in a decreased concentration. In some embodiments, polyhydroxy acids can include cyclic compounds or alkyl chain compounds including more than 2 hydroxyl substituents within the compound. For example, gluconolactone is a cyclic lactone with 4 hydroxy substituents. Not limiting to but merely to provide an example, a linear polyhydroxy acid may include gluconic acid. Other examples of activators can include lactones and other acids demonstrating similar properties as described above. In some embodiments, the activator may be added to the reaction from about 0.25 wt. % to about 10 wt. % by weight of the activator to the volume of the reaction mixture.

In some examples, the activator can be added as a solid to the reaction mixture of sodium nitrite and the ammonium-based compound. The activator can include, for example, gluconolactone that can be added in a solid form to the reaction mixture. The gluconolactone may additionally or alternatively be dissolved first in a solution before being added to the reaction mixture of sodium nitrite and the ammonium-based compound. In some examples, the sodium nitrite may be first dissolved in a solution before being added to the reaction mixture with an ammonium-based compound. Additionally or alternatively, the ammonium-based compound may be first dissolved in a solution before being added to the reaction mixture. The solution may include one or more of water, fresh water, produced water, brine, other flow back fluids, organic solvents, inorganic solvents, etc. In some embodiments, the solution may include minerals, salts, hydrocarbons, or viscosity modifying additives such as guar, polyacrylamide, cellulose-derived polymers, and the like.

Other methods for delaying the exothermic reaction by use of the activator can include encapsulating the activator in a soluble polymer. Upon addition to the mixture, the polymer may be solubilized, and the activator can be released into the mixture. Alternatively, the exothermic reaction mixture can be delayed by adding, to the mixture, a crystalline form of the activator. The crystalline form can include larger particles that may take an increased time to dissolve. The increased time can increase the delay of the exothermic reaction mixture. In some embodiments, the exothermic reaction may further include, adding a foaming agent for generating an exothermic foaming material for removing damaging material. For example, the foaming agent may be included in the exothermic reaction to reduce the density of the exothermic reaction solution. In some embodiments, the foaming agent may additionally or alternatively allow for heat dissipation along the damaging material and better disperse and transport the damaging material from the flowline or pipeline.

At block 206, damaging material is removed, using the exothermic reaction, from the flowline or pipeline 110 for controlling a production operation or any other suitable production operation. The exothermic reaction mixture can generate heat upon reacting, increase the temperature of the low temperature segment 116, and break down, dissolve, or thin down the damaging material such that it can be removed from the flowline or pipeline 110. For example, the increase in heat caused by the exothermic reaction can cause the damaging material to be removed from the flowline or pipeline 110. The exothermic reaction of an ammonium-based compound and sodium nitrite, or other suitable reactants for the exothermic reaction, can generate nitrogen gas. For example, nitrogen gas can be generated from the exothermic reaction and can create a pressure increase in the wellbore. The pressure change may aid in removing damaging material from the wellbore. The damaging material, once released from the flowline or pipeline 110, after the exothermic reaction, can be pumped from the flowline or pipeline 110.

Figure 3:
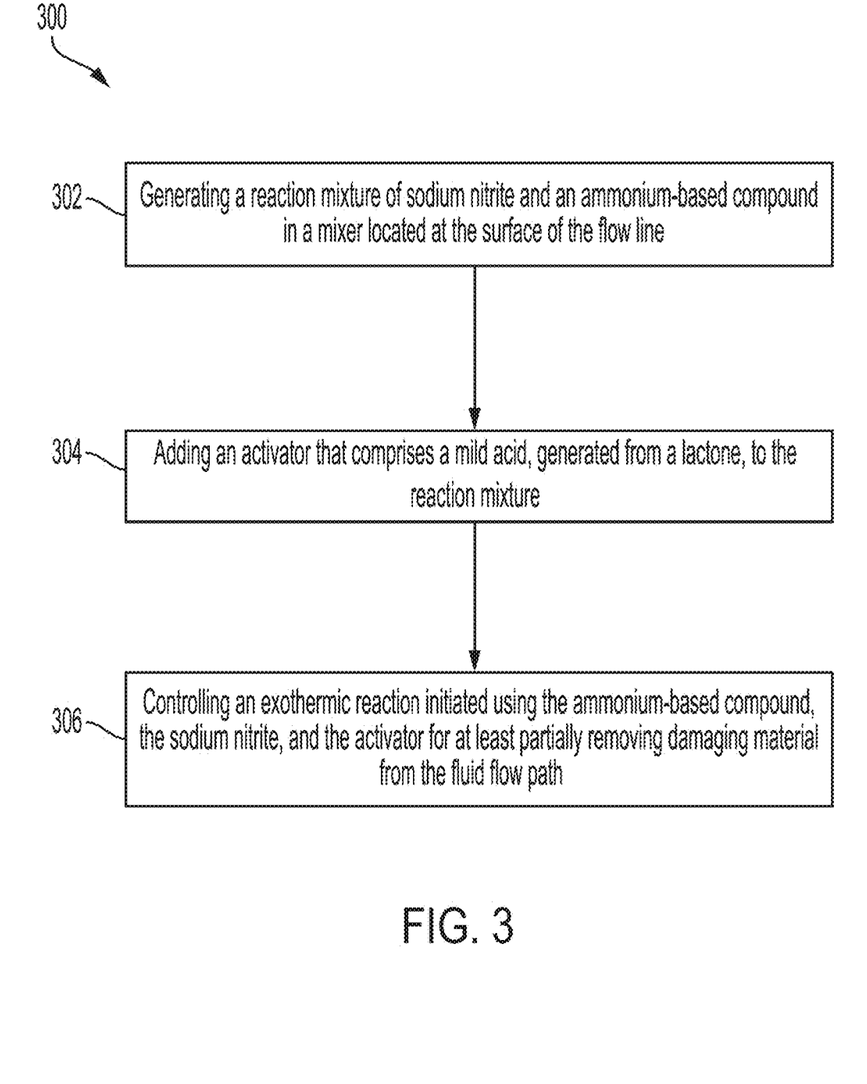
FIG. 3 is a flowchart of a process for injecting an exothermic reaction mixture and low temperature catalyst into a flowline or into a subterranean formation for removing damaging material from the flowline or subterranean formation according to one example of the present disclosure.

FIG. 3 is a flowchart of a process 300 for injecting an exothermic reaction mixture into a flowline according to one example of the present disclosure. At block 302 a reaction mixture is deployed into a target zone of the flowline or pipeline 110. The target zone can include the low temperature segment 116 within the flowline 110. Additionally or alternatively, the target zone may be a segment within the flowline 110 where the flow of a hydrocarbon fluid has been decreased from a normal flow rate. The reaction mixture can be deployed to the target zone using a tubing string. For example, the wellbore operator or automatic control device may determine an area of low temperature and designate the area as the low temperature segment 116. Additionally or alternatively, the low temperature segment 116 may be located by a reduced pressure flow through the wellbore due to the damaging material 118 on the flowline 110. The reaction mixture may be injected into the flowline 110 through the tubing string. The tubing string may be in fluid communication with fluid pumps at the surface. The mixture of sodium nitrite and ammonium-based compound may not initiate an exothermic reaction in the low temperature segment 116 without the inclusion of an activator.

At block 304 an activator, such as an acid generated from a lactone, is added to the sodium nitrite and ammonium-based compound mixture. The activator in water may generate hydrogen ions ($H^+$) that can initiate the reaction of sodium nitrite and the ammonium-based compound at low temperatures or by decreasing the pH of the solution. For example, the ammonium-based compound can be urea. The reaction between urea and sodium nitrite can generate energy in the form of heat that can be released to the surrounding environment. In some examples, the activator can be added in a concentration that may depend on the reaction mixture of sodium nitrite and the ammonium-based compound. The activator, in combination with the sodium nitrite and the ammonium-based compound, may produce water, salts, and clean nitrogen gas. For example, clean nitrogen gas can include diatomic nitrogen, also known as $N_2$ gas. In some embodiments, no other additives are added to the reaction mixture. For example, the exothermic reaction may be generated from the ammonium-based compound, the sodium nitrite, and the activator and may only produce one form of nitrogen gas such as diatomic nitrogen gas. For example, undesirable nitrogen gas can include nitrogen oxides, nitrogen dioxides, nitrous oxides, or other non-pure nitrogen gas. In some embodiments, the exothermic reaction described herein does not produce undesirable nitrogen gases.

At block 306 the exothermic reaction mixture comprising the ammonium-based compound, sodium nitrite, and the activator is controlled for removing the damaging material 118 from a flowline or pipeline 110. The reaction of the ammonium-based compound and sodium nitrite may not initiate when the pH measures above 5 or if the temperature of the wellbore drops below 70° F. (21° C.). In both situations, adding the activator can allow for the reaction to initiate and to generate the heat that may be used as an aid in removing the damaging material. To control the rate of the reaction, the activator concentration can be varied to either increase or decrease the time in which the exothermic reaction is initiated.

Figure 4:
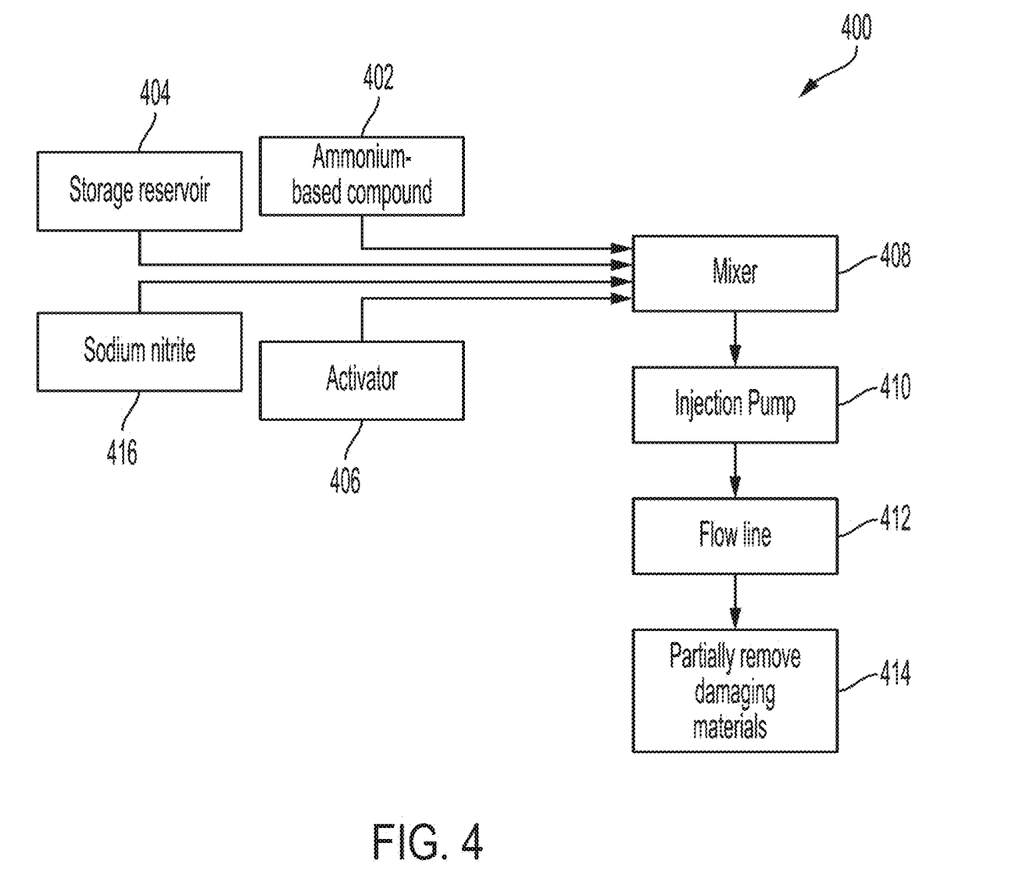
FIG. 4 is a block diagram of a process flow for using an exothermic reaction mixture and an activator to remove damaging material such as paraffin from a flowline, or a subterranean formation according to one example of the present disclosure.

FIG. 4 is a block diagram of a process flow 400 for using an exothermic reaction mixture and an activator to remove damaging material from the flowline or pipeline 110 according to one example of the present disclosure. The process may involve one or more reservoirs for storing the ammonium-based compound 402, sodium nitrite 416, and activator 406. The reservoirs can be in fluid connection with a mixer 408 that contacts the activator 406, ammonium-based compound 402, and sodium nitrite 416 to form the exothermic reaction mixture having activator. The mixture can be in fluid communication with the injection pump 410 to inject the mixture fluid into the flowline 412. The storage reservoir 404 can be used for a buffer, a solvent, a surfactant, or a combination thereof and can be added to the mixer 408 to control the exothermic reaction. The reaction mixture can be injected into the flowline 412 for removing damaging materials 414 from the flowline 412. For example, the sodium nitrite can be dissolved to form a solution of nitrite ions. The solution of sodium nitrite ions can be mixed with a solution of ammonium ions to form the exothermic reaction mixture. The exothermic reaction mixture (including nitrite ions and ammonium ions) can be mixed with a solution including the oxidizer. The solution including the activator, nitrite ions, and ammonium ions can be mixed in the mixer 408 before being infected into the flowline 110 through the injection pump 410.

In some embodiments, the reaction mixture can include the ammonium-based compound, the sodium nitrite, and the activator for delayed release of the energy. In some embodiments, the reaction mixture can include the sodium nitrite, the ammonium-based compound, the activator in an increased concentration, and a surfactant to generate the energy release faster and in a foam form. The increased reaction rate, for example, can be used when the low temperature segment 116 can be closer to the surface and may not involve a long delay.

In some embodiments, a buffer can be added to the reaction mixture to delay the exothermic reaction. Alternatively, the storage reservoir 404 can be used for a surfactant. The surfactant can control the rate or the reaction by increasing the interactions between the ammonium-based compound and the sodium nitrite. Additionally or alternatively, or alternatively, the surfactant can delay the reaction between the ammonium-based compound and the sodium nitrite by generating micelles in the mixture. The micelles may act as an encapsulating agent whereby within the interior of the micelles the oxidizer can be trapped. In low temperature zones, the micelles can prevent the oxidizer from acting as a catalyst in the reaction and can delay the energy release of the reaction.

In one or more examples, the ammonium-based compound, the activator, and the sodium nitrite may be dissolved in a solution. The solution may be water, fresh water, produced water, brine, organic or inorganic solvents, or other flow-back fluids. In some examples, the solution may include minerals, salts, hydrocarbons, or viscosity-modifying additives such as guar, polyacrylamide, or cellulose-derived polymers.

Figure 5:
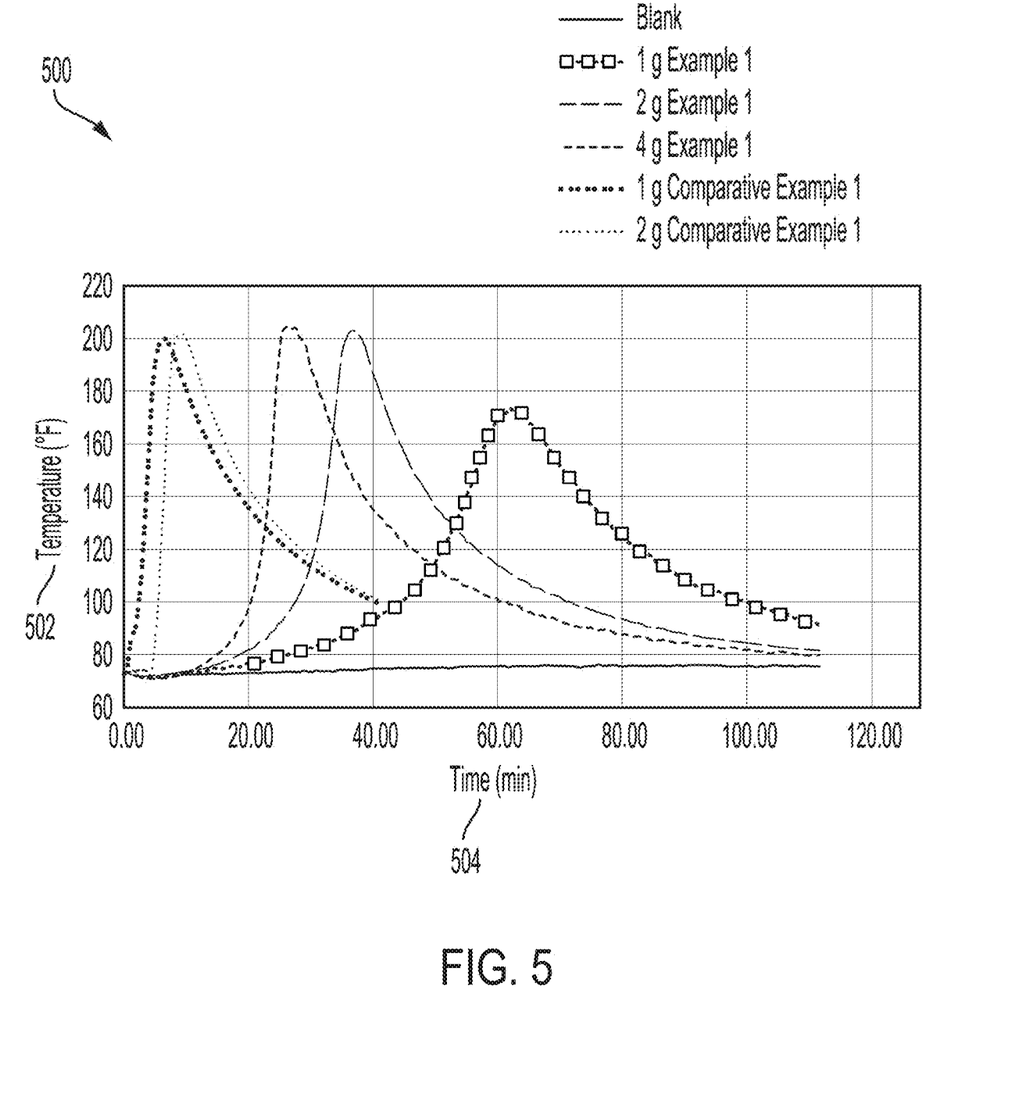
FIG. 5 is a graph of the temperature change of an exothermic reaction using an activator according to one example of the present disclosure.

FIG. 5 is a graph 500 of sample temperature vs. time according to one example of the present disclosure. The sample temperature 502 may be the y-axis, and the time 504 may be the x-axis. The exothermic reaction resulting from the ammonium-based compound, sodium nitrite, and the activator may be illustrated by the graph 500. As illustrated, the exothermic reaction may generate energy in the form of heat above 160° F. (71° C.) when the concentration of Example 1 (gluconolactone) is increased from 1 gram up to 4 grams, and the Comparative Example (citric acid) compound is increased from 1 gram to 2 grams. The graph is summarized in Table 1, below. When equal concentrations of sodium nitrite and ammonium chloride are used for generating the exothermic reaction and an activator is added, the temperature achieved was above 170° F. (76° C.). The activator may be used to delay the exothermic reaction such as to not initiate the exothermic reaction to fast. For example, when Comparative Example 1 was added to the reaction, the time required for the reaction to reach peak temperature was 6 minutes. When increasing the concentration of Comparative Example 1 to two grams, the time required was 9.5 minutes. However, by adding Example 1 to the reaction mixture at 1 gram (g) the reaction time was 63 minutes and by doubling the concentration of Example 1, the reaction time dropped to 36.5 minutes. Furthermore, adding 4 g of Example 1 further decreased the reaction rate to 27.4 minutes. The results demonstrate Example 1 activator is capable of controlling the exothermic reaction proportionally to the concentration of the activator added. Alternatively, the results demonstrate Comparative Example 1 is not capable of controlling the exothermic reaction proportional to the concentration of comparative example 1. For example, by doubling the concentration of Comparative Example 1, the reaction time required but alternatively the time required increased. The exothermic reaction including no activator ran for an extended period of time under ambient conditions and did not initiate the reaction. For example, as shown in Table 1, the reaction including zero grams of Example 1 and zero grams of Comparative Example 1 did not have a recorded temperature increase or a time required to reach the peak temperature because the test ran for over 120 minutes before being ended manually.

TABLE 1

Test Formulations for Exothermic Reactions at 4 Mol of Reactants

| Ammonium Chloride (4 Mol.) | Sodium Nitrite (4 Mol.) | Example 1 (g) | Comparative Example 1 (g) | Temp. Achieved (° F.) | Time Required (Min.) |
|---|---|---|---|---|---|
| 50 mL | 50 mL | 0 | 0 | 0 | N/A |
| 50 mL | 50 mL | 1 | 0 | 171 | 63 |
| 50 mL | 50 mL | 2 | 0 | 203 | 36.5 |
| 50 mL | 50 mL | 4 | 0 | 204 | 27.4 |
| 50 mL | 50 mL | 0 | 1 | 200 | 6 |
| 50 mL | 50 mL | 0 | 2 | 203 | 9.5 |

In some examples, the concentration of the sodium nitrite and the ammonium-based compound can be adjusted to increase the temperature release from the reaction. For example, the reaction mixture can be a 1:1 ratio of sodium nitrite to ammonium-based compound. Additionally or alternatively, the reaction mixture may be 1:2, 1:3, 1:4, 2:1, 3:1, or 4:1 respectively or any variation or deviation thereof.

Figure 6:
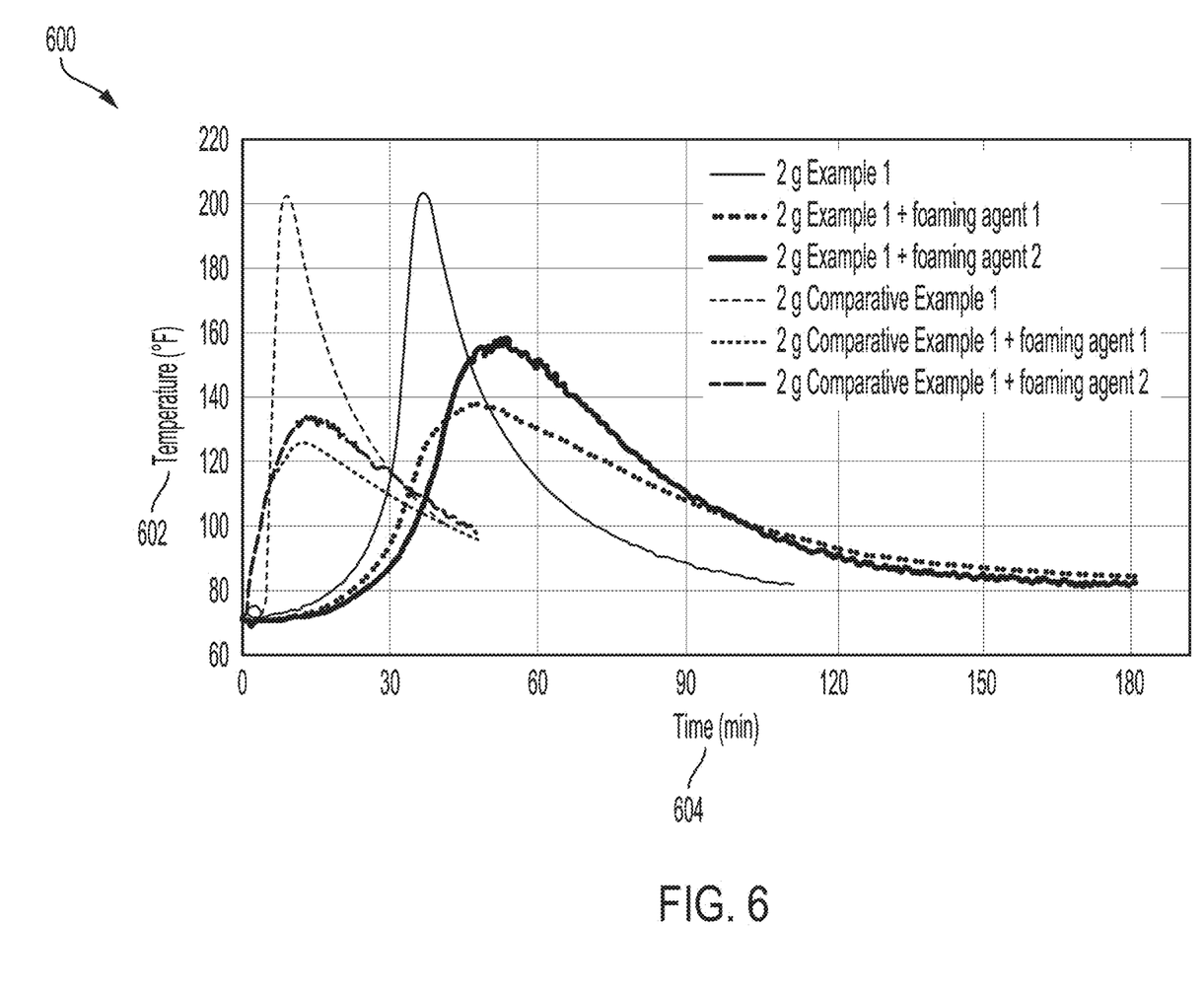
FIG. 6 is a graph of the temperature change of an exothermic reaction using an activator and foaming agents according to one example of the present disclosure.

FIG. 6 is a graph of the temperature change of an exothermic reaction using the Example 1 activator and two different foaming agents compared to Comparative Example 1 activator and the same two foaming agents according to one example of the present disclosure. FIG. 6 is a graph 600 of sample temperature vs. time according to one example of the present disclosure. The sample temperature 602 may be the y-axis, and the time 604 may be the x-axis. The exothermic reaction resulting from the ammonium-based compound, sodium nitrite, and the activator may be illustrated by the graph 600. As illustrated, the exothermic reaction may generate energy in the form of heat above 120° F. (49° C.) when the concentration of Example 1 and the Comparative Example 1 compound are combined with a foaming agent. The graph 600 is summarized in Table 2, below. The foaming agent, when added to the reaction with Comparative Example 1 and Example 1 activator did not change the rate of the reaction when compared to Table 1, above. For example, the foaming agent when added to the exothermic reaction with Comparative Example 1 activator took from 9 minutes to 14 minutes to reach the maximum temperature release. Alternatively, the exothermic reaction mixture using Example 1 activator and foaming agent 1 reached a peak temperature of 137° F. (58° C.) in 48 minutes, while foaming agent two reached a peak temperature of 158° F. (70° C.) in 53.5 minutes. It is important to note that the peak temperature is lower than the control experiments (no foaming agent) likely due to heat dissipation from the foam to the surrounding environment. In some embodiments, the reaction time may be controlled by the foaming agent used in the reaction while maintaining equal concentrations of the activator. One skilled in the art would understand that in a flowline or pipeline the temperature reached from the exothermic reaction may be higher than what is achieved in an open environment experiment such as the ones performed here. The experiments performed herein are to demonstrate the effects the activator and foaming agent have on the exothermic reaction and should not be limited to the temperature ranges reached in the open environment experiments.

TABLE 2

Test Formulations for Exothermic Reactions (With and Without Foaming Agents)

| Ammonium Chloride (4 Mol.) | Sodium Nitrite (4 Mol.) | Example 1 (g) | Comparative Example 1 (g) | Foaming Agent 1 (mL) | Foaming Agent 2 (mL) | Temp. Achieved (° F.) | Time Required (Min.) |
|---|---|---|---|---|---|---|---|
| 50 mL | 50 mL | 2 | 0 | 0 | 0 | 203 | 36.5 |
| 50 mL | 50 mL | 2 | 0 | 2 | 0 | 137 | 48 |
| 50 mL | 50 mL | 2 | 0 | 0 | 2 | 158 | 53.5 |
| 50 mL | 50 mL | 0 | 2 | 0 | 0 | 203 | 9.5 |
| 50 mL | 50 mL | 0 | 2 | 2 | 0 | 124 | 9 |
| 50 mL | 50 mL | 0 | 2 | 0 | 2 | 133 | 14 |

Figure 7:
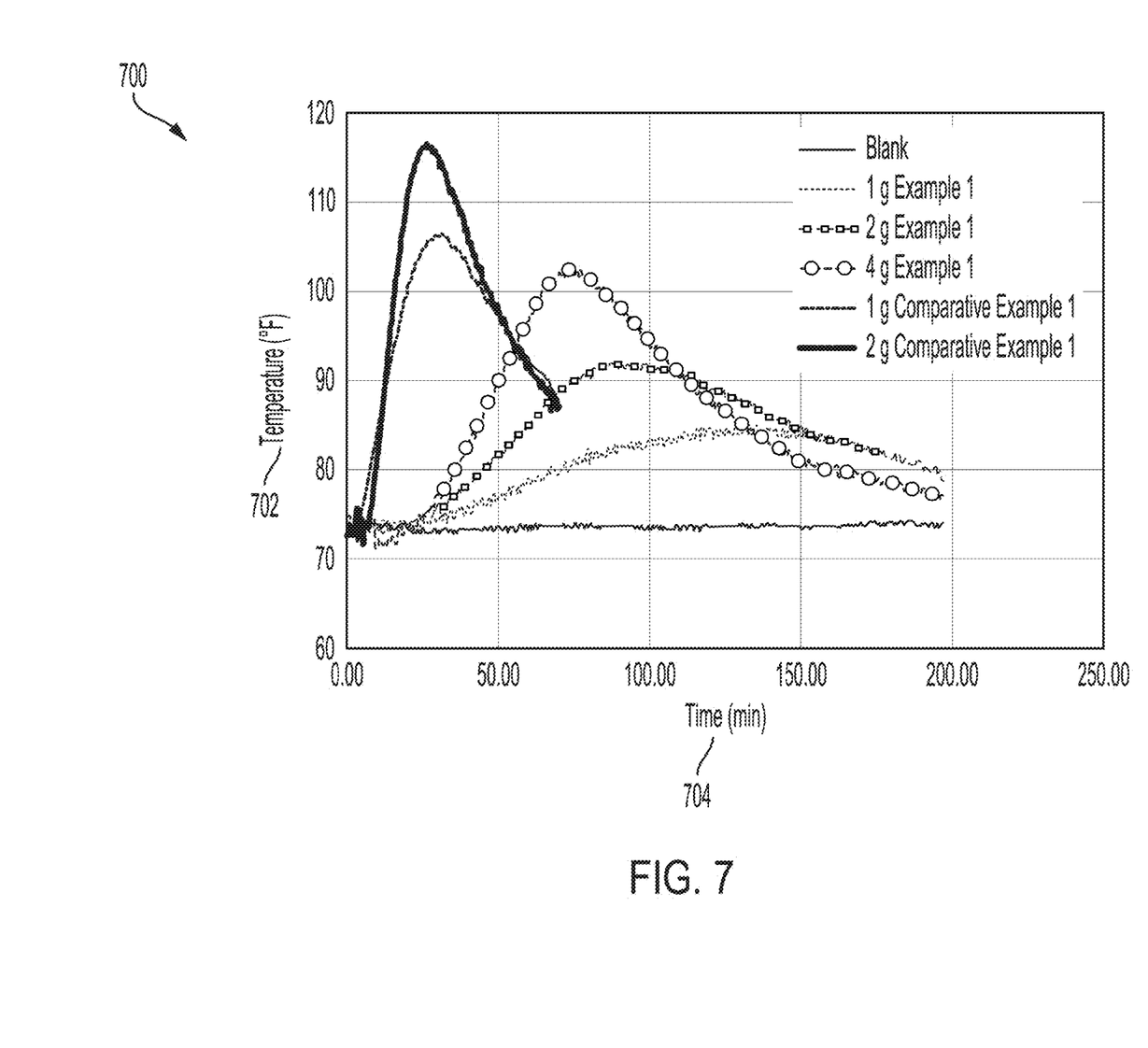
FIG. 7 is a graph of the temperature change of an exothermic reaction using activator at different concentrations according to one example of the present disclosure.

FIG. 7 is a graph 700 of sample temperature vs. time in response to varying the concentration of the Example 1 activator and the Comparative Example 1 activator in two molar reaction conditions of Aluminum chloride and sodium nitrite. The sample temperature 702 may be the y-axis and the time 704 may be the x-axis. The graph 700 illustrates that the time for the exothermic reaction to occur may be adjusted by adjusting the Example 1 activator. The graph 700 is summarized in Table 3, below. For example, when the reactants are held at a two-molar concentration, Example 1 activator added in 1 gram reached a peak temperature of 85° F. (29° C.) in about 118 minutes. By adding 2 grams of Example 1 activator, the reaction reached a peak temperature of about 92° F. (33° C.) in 89 minutes. Additionally or alternatively, adding 4 g of Example 1 activator to the reaction mixture reached a peak temperature of 103° F. (40° C.) in 75.5 minutes. Alternatively, Comparative Example 1 activator when added in 1 g or 2 g concentrations to the reaction mixture conditions reached peak temperatures of about 107° F. (40° C.) and 116° F. (46° C.), respectively, while the time to reach the peak temperature was not varied. Thus, Example 1 activator demonstrates an ability to not only control the reaction time by altering the concentration added to the reaction but also capable of altering the maximum temperature reached in the reaction.

TABLE 3

Test Formulations for Exothermic Reactions at 4 Mol of Reactants

| Ammonium Chloride (2 Mol.) | Sodium Nitrite (2 Mol.) | Example 1 (g) | Comparative Example 1 (g) | Temp. Achieved (° F.) | Time Required (Min.) |
|---|---|---|---|---|---|
| 50 mL | 50 mL | 0 | 0 | 0 | N/A |
| 50 mL | 50 mL | 1 | 0 | 85 | 118 |
| 50 mL | 50 mL | 2 | 0 | 92 | 89 |
| 50 mL | 50 mL | 4 | 0 | 103 | 75.5 |
| 50 mL | 50 mL | 0 | 1 | 107 | 31 |
| 50 mL | 50 mL | 0 | 2 | 116 | 28 |

In some aspects, methods and mixtures for a low temperature catalyst for causing an exothermic reaction for removing damaging material from a wellbore during wellbore operations are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: forming an exothermic reaction mixture comprising sodium nitrite, an ammonium-based compound, and an activator, wherein the activator comprises an acid, wherein the acid is generated from a lactone; and providing the exothermic reaction mixture in a fluid flow path for initiating an exothermic reaction to at least partially remove damaging material from the fluid flow path.

Example 2 is the method of example 1, wherein the exothermic reaction produces salt, water, and diatomic nitrogen gas as byproducts.

Example 3 is the method of any one of examples 1-2, wherein the lactone is selected from a group consisting of gluconolactone, glucuronolactone, α-acetolactone, β-propiolactone, γ-butyrolactone, δ-valerolactone, ε-caprolactone, γ-decalactone, δ-decalactone, γ-dodecalactone, γ-octalactone, γ-nonalactone, γ-undecalactone, ellagic acid (hexahydroxydiphenic acid dialactone), flavogallonic acid dilactone, tergallic acid dilactone, valoneic acid dilactone, ethylene brassylate, and any combination thereof.

Example 4 is the method of any one of examples 1-3, wherein the activator reduces a pH of the exothermic reaction mixture to between 3 and 6.

Example 5 is the method of any one of examples 1-4, wherein the activator is added to the exothermic reaction mixture in an amount of from about 0.25 wt. % to about 10 wt. % by weight to volume of the reaction mixture.

Example 6 is the method of any one of examples 1-5, further comprising a foaming agent, wherein the foaming agent is selected from a group consisting of alkyl amines, alkylamine salts, alkylamidobetaines such as cocoamidopropyl betaine, tirmethylallowammonium chloride, trimethylcocoammonium chloride, cocoamidopropyl betaine, amide quarternary ammonium surfactants with a chemical formula $C_nH_{2n+1}CONH(CH_2)_2N^+(CH_3)3 \cdot CH3CO3-$ (n=9, 11, 13, 15), 2-(2-butoxyethoxy)ethanol, 2-(2-ethoxyethoxy)ethanol, 2-(2-methoxyethoxy)ethanol, 2-butoxyethanol, 2-ethoxyethanol, 2-ethoxyethyl acetate, bis(2-methoxyethyl)ether, alkoxylated nonylphenols, alkyloxylated lineral alcohols, alkyloxylated branched chain alcohols, propylene oxide condensate block copolymers, salts of aliphatic sulfonic acids, alpha-olefin sulfonate, C8 to C22 alkylethoxylate sulfate, and any combination thereof.

Example 7 is the method of any one of examples 1-6, wherein the damaging material comprises waxes, paraffin deposits, or scales that restrict the flow of a hydrocarbon fluid with respect to the fluid flow path.

Example 8 is a reaction mixture comprising: an ammonium-based compound; sodium nitrite; and an activator that comprises an acid for initiating an exothermic reaction using the reaction mixture, the exothermic reaction controllable in a fluid flow path to at least partially remove damaging material from the fluid flow path, wherein the acid is generated from a lactone.

Example 9 is the reaction mixture of example 8, wherein the lactone is selected from a group consisting of gluconolactone, glucuronolactone, α-acetolactone, β-propiolactone, γ-butyrolactone, δ-valerolactone, ε-caprolactone, γ-decalactone, δ-decalactone, γ-dodecalactone, γ-octalactone, γ-nonalactone, γ-undecalactone, ellagic acid (hexahydroxydiphenic acid dialactone), flavogallonic acid dilactone, tergallic acid dilactone, valoneic acid dilactone, ethylene brassylate, and any combination thereof.

Example 10 is the reaction mixture of any one of examples 8-9, further comprising a foaming agent, wherein the foaming agent is selected from a group consisting of alkyl amines, alkylamine salts, alkylamidobetaines such as cocoamidopropyl betaine, tirmethylallowammonium chloride, trimethylcocoammonium chloride, cocoamidopropyl betaine, amide quarternary ammonium surfactants with a chemical formula $C_nH_{2n+1}CONH(CH_2)_2N^+(CH_3)3·CH3CO3-$ (n=9, 11, 13, 15), 2-(2-butoxyethoxy)ethanol, 2-(2-ethoxyethoxy)ethanol, 2-(2-methoxyethoxy)ethanol, 2-butoxyethanol, 2-ethoxyethanol, 2-ethoxyethyl acetate, bis(2-methoxyethyl)ether, alkoxylated nonylphenols, alkyloxylated lineral alcohols, alkyloxylated branched chain alcohols, propylene oxide condensate block copolymers, salts of aliphatic sulfonic acids, alpha-olefin sulfonate, C8 to C22 alkylethoxylate sulfate, and any combination thereof.

Example 11 is the reaction mixture any one of examples 8-10, wherein the activator reduces a pH of the exothermic reaction mixture to between 3 and 6.

Example 12 is the reaction mixture of any one of examples 8-11, wherein the reaction mixture produces salt, water, and diatomic nitrogen gas as byproducts.

Example 13 is the reaction mixture of any one of examples 8-21, wherein the activator is added to the exothermic reaction mixture in an amount of from about 0.25 wt. % to about 10 wt. % by weight to volume of the reaction mixture.

Example 14 is the reaction mixture of any one of examples 8-13, wherein the damaging material comprises waxes, paraffin deposits, or scales that restrict the flow of a hydrocarbon fluid with respect to the fluid flow path.

Example 15 is a method comprising, generating a reaction mixture of sodium nitrite and an ammonium-based compound in a mixer located at a surface of a fluid flow path; adding an activator that comprises an acid to the reaction mixture, wherein the acid is generated from a lactone; and controlling an exothermic reaction initiated using the ammonium-based compound, the sodium nitrite, and the activator for at least partially removing damaging material from the fluid flow path.

Example 16 is the method of example 15, wherein the lactone is selected from a group consisting of gluconolactone, glucuronolactone, α-acetolactone, β-propiolactone, γ-butyrolactone, δ-valerolactone, ε-caprolactone, γ-decalactone, δ-decalactone, γ-dodecalactone, γ-octalactone, γ-nonalactone, γ-undecalactone, ellagic acid (hexahydroxydiphenic acid dialactone), flavogallonic acid dilactone, tergallic acid dilactone, valoneic acid dilactone, ethylene brassylate, and any combination thereof.

Example 17 is the method of any one of examples 15-16, wherein the exothermic reaction produces salt, water, and diatomic nitrogen gas as byproducts.

Example 18 is the method of any one of examples 15-17, further comprising a foaming agent, wherein the foaming agent is selected from a group consisting of alkyl amines, alkylamine salts, alkylamidobetaines such as cocoamidopropyl betaine, tirmethylallowammonium chloride, trimethylcocoammonium chloride, cocoamidopropyl betaine, amide quarternary ammonium surfactants with a chemical formula $C_nH_{2n+1}CONH(CH_2)_2N^+(CH_3)3·CH3CO3-$ (n=9, 11, 13, 15), 2-(2-butoxyethoxy)ethanol, 2-(2-ethoxyethoxy)ethanol, 2-(2-methoxyethoxy)ethanol, 2-butoxyethanol, 2-ethoxyethanol, 2-ethoxyethyl acetate, bis(2-methoxyethyl)ether, alkoxylated nonylphenols, alkyloxylated lineral alcohols, alkyloxylated branched chain alcohols, propylene oxide condensate block copolymers, salts of aliphatic sulfonic acids, alpha-olefin sulfonate, C8 to C22 alkylethoxylate sulfate, and any combination thereof.

Example 19 is the method of any one of examples 15-18, wherein the activator is added to the reaction mixture in an amount of from about 0.25 wt. % to about 10 wt. % by weight to volume of the reaction mixture.

Example 20 is the method of any one of examples 15-19, wherein controlling the exothermic reaction comprises the steps of: determining the location of the damaging material within the fluid flow path; mixing the sodium nitrite, the ammonium-based compound, in a mixer located at a surface of the fluid flow path; and adding, to the mixture of sodium nitrite and ammonium-based compound, an amount of activator for at least partially removing the damaging material from the fluid flow path, wherein an amount of the activator is determined based on the location of the damaging material, and wherein the exothermic reaction is initiated at the location of the damaging material within the fluid flow path.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
    forming an exothermic reaction mixture comprising sodium nitrite, an ammonium-based compound, and an activator, wherein the activator comprises an acid, wherein the acid is generated from a lactone, wherein the lactone is selected from a group consisting of gluconolactone, glucuronolactone, a phenol-based acid, and any combination thereof; and
    providing the exothermic reaction mixture in a fluid flow path for initiating an exothermic reaction to at least partially remove damaging material from the fluid flow path.

2. The method of claim 1, wherein the exothermic reaction produces salt, water, and diatomic nitrogen gas as byproducts.

3. The method of claim 1, wherein the activator reduces a pH of the exothermic reaction mixture to between 3 and 6.

4. The method of claim 1, wherein the activator is added to the exothermic reaction mixture in an amount of from about 0.25 wt. % to about 10 wt. % by weight to volume of the reaction mixture.

5. The method of claim 1, further comprising a foaming agent, wherein the foaming agent is selected from a group consisting of alkyl amines, alkylamine salts, alkylamidobetaines such as cocoamidopropyl betaine, tirmethylallowammonium chloride, trimethylcocoammonium chloride, cocoamidopropyl betaine, amide quarternary ammonium surfactants with a chemical formula $C_n—H_{2n+1}CONH(CH_2)_2N^+(CH_3)3·CH3CO3-$ (n=9, 11, 13, 15), 2-(2-butoxyethoxy) ethanol, 2-(2-ethoxyethoxy) ethanol, 2-(2-methoxyethoxy) ethanol, 2-butoxyethanol, 2-ethoxyethanol, 2-ethoxyethyl acetate, bis(2-methoxyethyl) ether, alkoxylated nonylphenols, alkyloxylated lineral alcohols, alkyloxylated branched chain alcohols, propylene oxide condensate block copolymers, salts of aliphatic sulfonic acids, alpha-olefin sultanate, C8 to C22 alkylethoxylate sulfate, and any combination thereof.

6. The method of claim 1, wherein the damaging material comprises waxes, paraffin deposits, or scales that restrict the flow of a hydrocarbon fluid with respect to the fluid flow path.

7. A reaction mixture comprising:
an ammonium-based compound;
sodium nitrite; and
an activator that comprises an acid for initiating an exothermic reaction using the reaction mixture, the exothermic reaction controllable in a fluid flow path to at least partially remove damaging material from the fluid flow path, wherein the acid is generated from a lactone, wherein the lactone is selected from a group consisting of gluconolactone, glucuronolactone, a phenol-based acid, and any combination thereof.

8. The reaction mixture of claim 7, further comprising a foaming agent, wherein the foaming agent is selected from a group consisting of alkyl amines, alkylamine salts, alkylamidobetaines such as cocoamidopropyl betaine, tirmethylallowammonium chloride, trimethylcocoammonium chloride, cocoamidopropyl betaine, amide quarternary ammonium surfactants with a chemical formula $C_n$-$H_{2n+1}CONH(CH_2)_2N^+(CH_3)3 \cdot CH3CO3$- (n=9, 11, 13, 15), 2-(2-butoxyethoxy) ethanol, 2-(2-ethoxyethoxy) ethanol, 2-(2-methoxyethoxy) ethanol, 2-butoxyethanol, 2-ethoxyethanol, 2-ethoxyethyl acetate, bis(2-methoxyethyl) ether, alkoxylated nonylphenols, alkyloxylated lineral alcohols, alkyloxylated branched chain alcohols, propylene oxide condensate block copolymers, salts of aliphatic sulfonic acids, alpha-olefin sultanate, C8 to C22 alkylethoxylate sulfate, and any combination thereof.

9. The reaction mixture in claim 7, wherein the activator reduces a pH of the exothermic reaction mixture to between 3 and 6.

10. The reaction mixture in claim 7, wherein the exothermic reaction produces salt, water, and diatomic nitrogen gas as byproducts.

11. The reaction mixture of claim 7, wherein the activator is added to the exothermic reaction mixture in an amount of from about 0.25 wt. % to about 10 wt. % by weight to volume of the reaction mixture.

12. The reaction mixture of claim 7, wherein the damaging material comprises waxes, paraffin deposits, or scales that restrict the flow of a hydrocarbon fluid with respect to the fluid flow path.

13. A method comprising:
generating a reaction mixture of sodium nitrite and an ammonium-based compound in a mixer located at a surface of a fluid flow path;
adding an activator that comprises an acid to the reaction mixture, wherein the acid is generated from a lactone, wherein the lactone is selected from a group consisting of gluconolactone, glucuronolactone, a phenol-based acid, and any combination thereof; and
controlling an exothermic reaction initiated using the ammonium-based compound, the sodium nitrite, and the activator for at least partially removing damaging material from the fluid flow path.

14. The method of claim 13, wherein the exothermic reaction produces salt, water, and diatomic nitrogen gas as byproducts.

15. The method of claim 13, further comprising a foaming agent, wherein the foaming agent is selected from a group consisting of alkyl amines, alkylamine salts, alkylamidobetaines such as cocoamidopropyl betaine, tirmethylallowammonium chloride, trimethylcocoammonium chloride, cocoamidopropyl betaine, amide quarternary ammonium surfactants with a chemical formula $C_n$—$H_{2n+1}CONH(CH_2)_2N^+(CH_3)3 \cdot CH3CO3$- (n=9, 11, 13, 15), 2-(2-butoxyethoxy) ethanol, 2-(2-ethoxyethoxy) ethanol, 2-(2-methoxyethoxy) ethanol, 2-butoxyethanol, 2-ethoxyethanol, 2-ethoxyethyl acetate, bis(2-methoxyethyl) ether, alkoxylated nonylphenols, alkyloxylated lineral alcohols, alkyloxylated branched chain alcohols, propylene oxide condensate block copolymers, salts of aliphatic sulfonic acids, alpha-olefin sultanate, C8 to C22 alkylethoxylate sulfate, and any combination thereof.

16. The method of claim 13, wherein the activator is added to the reaction mixture in an amount of from about 0.25 wt. % to about 10 wt. % by weight to volume of the reaction mixture.

17. The method of claim 13, wherein controlling the exothermic reaction comprises the steps of:
determining the location of the damaging material within the fluid flow path;
mixing the sodium nitrite, the ammonium-based compound, in a mixer located at a surface of the fluid flow path; and
adding, to the mixture of sodium nitrite and ammonium-based compound, an amount of activator for at least partially removing the damaging material from the fluid flow path, wherein an amount of the activator is determined based on the location of the damaging material, and wherein the exothermic reaction is initiated at the location of the damaging material within the fluid flow path.

* * * * *